United States Patent
Dong et al.

(10) Patent No.: US 11,530,988 B1
(45) Date of Patent: Dec. 20, 2022

(54) FLUORESCENCE TRIPLE-CORRELATION SPECTROSCOPY SYSTEM FOR ANALYZING INTERACTION BETWEEN THREE KINDS OF MOLECULES

(71) Applicant: SHANGHAI JIAO TONG UNIVERSITY, Shanghai (CN)

(72) Inventors: Chaoqing Dong, Shanghai (CN); Jicun Ren, Shanghai (CN)

(73) Assignee: SHANGHAI JIAO TONG UNIVERSITY, Shanghai (CN)

( * ) Notice: Subject to any disclaimer, the term of this patent is extended or adjusted under 35 U.S.C. 154(b) by 0 days.

(21) Appl. No.: 17/744,909

(22) Filed: May 16, 2022

(51) Int. Cl.
*G01N 21/64* (2006.01)

(52) U.S. Cl.
CPC . *G01N 21/6428* (2013.01); *G01N 2021/6419* (2013.01); *G01N 2021/6439* (2013.01)

(58) Field of Classification Search
CPC ....... G01N 21/6428; G01N 2021/6439; G01N 2021/6419; G01B 21/64
See application file for complete search history.

(56) References Cited

U.S. PATENT DOCUMENTS

| | | | | |
|---|---|---|---|---|
| 2007/0024964 A1* | 2/2007 | Ishibashi | ............ | G01N 21/6408 359/380 |
| 2007/0262264 A1* | 11/2007 | Hasegawa | .......... | G02B 21/0032 250/458.1 |
| 2007/0291254 A1* | 12/2007 | Wolf | ..................... | G01J 3/4406 356/417 |
| 2009/0040518 A1* | 2/2009 | Widengren | ........ | G01N 21/6408 356/317 |
| 2010/0301231 A1* | 12/2010 | Yamaguchi | ........... | G01J 3/4406 250/459.1 |
| 2020/0166457 A1* | 5/2020 | Yasui | ................. | G02B 21/0032 |

FOREIGN PATENT DOCUMENTS

| | | |
|---|---|---|
| CN | 101019018 A | 8/2007 |
| CN | 101718696 A | 6/2010 |
| CN | 101900605 A | 12/2010 |
| CN | 110998295 A | 4/2020 |

(Continued)

OTHER PUBLICATIONS

Winkler, Thorsten, et al. "Confocal fluorescence coincidence analysis: an approach to ultra high-throughput screening." Proceedings of the National Academy of Sciences 96.4 (1999): 1375-1378. (Year: 1999).*

(Continued)

*Primary Examiner* — Dominic J Bologna
(74) *Attorney, Agent, or Firm* — Wayne IP LLC

(57) ABSTRACT

A ternary fluorescence correlation spectroscopy system for analyzing an interaction between three kinds of molecules, including at least three excitation light sources with different wavelengths. The excitation light sources are configured to illuminate and excite a sample to generate a fluorescence signal. The fluorescence signal is divided into multiple signals according to wavelength, which are then respectively detected by a single photon detector and transmitted to a signal acquisition and operation card to perform real-time operation of a triple-correlation function, so as to obtain a fluorescence triple-correlation spectroscopy curve.

8 Claims, 9 Drawing Sheets

(56) References Cited

FOREIGN PATENT DOCUMENTS

| JP | 2005283264 A | 10/2005 |
|----|--------------|---------|
| JP | 2011002415 A | 1/2011  |

OTHER PUBLICATIONS

Ridgeway, William K., David P. Millar, and James R. Williamson. "The spectroscopic basis of fluorescence triple correlation spectroscopy." The Journal of Physical Chemistry B 116.6 (2012): 1908-1919. (Year: 2012).*

Ridgeway, William K., David P. Millar, and James R. Williamson. "Quantitation of ten 30S ribosomal assembly intermediates using fluorescence triple correlation spectroscopy." Proceedings of the National Academy of Sciences 109.34 (2012): 13614-13619. (Year :2012).*

Dong, Chaoqing, and Jicun Ren. "Coupling of fluorescence correlation spectroscopy with capillary and microchannel analytical systems and its applications." Electrophoresis 35.16 (2014): 2267-2278. (Year: 2014).*

Dong Chenbo, Li Fucai, Dong Chaoqing, Cai Ping, Ren Jicun; The Developing of Laser Confocal Scanning Imaging-Fluorescence Correlation Spectroscopy System and Its Application; Journal of Analytical Science, vol. 36 No. 5, Oct. 2020; School of Electronic Information and Electronic Engineering, Shanghai Jiao Tong University, Shanghai 200240.

Jan W Krieger, Anand P Singh, Nirmalya Bag, Christoph S Garbe, Timothy E Saunders, Jorg Langowski & Thorsten Wohland; Imaging fluorescence (cross-) correlation spectroscopy in live cells and organisms; Nature Protocols, 2015, vol. 10 No. 12, 1948-1974; German Cancer Research Center (DKFZ), Heidelberg, Germany.

Shengrong Yu, Fucai Li, Xiangyi Huang, Chaoqing Dong and Jicun Ren; In Situ Study of Interactions between Endogenous c-myc mRNA with CRDBP in a Single Living Cell by Combining Fluorescence Cross-Correlation Spectroscopy with Molecular Beacons; Analytical Chemistry, 2020, 92, 2988-2996.

Tobias Kohl, Elke Haustein and Petra Schwille; Determining Protease Activity In Vivo by Fluorescence Cross-Correlation Analysis; Biophysical Journal, vol. 89, Oct. 2005, 2770-2782; Max-Planck Institute for Experimental Medicine, Gottingen, Germany.

* cited by examiner

FLUORESCENCE TRIPLE-CORRELATION SPECTROSCOPY SYSTEM FOR ANALYZING INTERACTION BETWEEN THREE KINDS OF MOLECULES

CROSS-REFERENCE TO RELATED APPLICATIONS

This application claims the benefit of priority from Chinese Patent Application No. 202110563055.3, filed on May 21, 2021. The content of the aforementioned applications, including any intervening amendments thereto, is incorporated herein by reference in its entirety.

TECHNICAL FIELD

The disclosure relates to spectroscopy analysis, and more specifically to a fluorescence triple-correlation spectroscopy system for analyzing an interaction between three kinds of molecules.

BACKGROUND

Microscopic imaging and spectroscopic analysis techniques, such as photoactivated localization microscopy (PALM) and stochastic optical reconstruction microscopy (STORM), have been extensively employed in life science researches, due to good non-invasiveness and high detection sensitivity. The continuous binary and ternary intermolecular interactions are closely associated with some biochemical processes, such as electron transfer, signal transduction, and functional regulation, and the cellular physiological functions. Abnormal intracellular intermolecular interactions, such as protein aggregation, may lead to many diseases such as Creutzfeldt-Jakob, Alzheimer's disease and cancer. Currently, the off-line analysis of the intermolecular interactions is often performed by yeast two-hybrid assay, affinity purification combined with mass spectrometry (AP-MS), Co-immunoprecipitation (Co-IP), protein microarray, analytical ultracentrifugation (AUC), surface plasmon resonance (SPR) analysis, and calorimetry. Whereas, the above-mentioned methods are unable to arrive at the in-situ analysis of the intermolecular interactions in living cells.

The fluorescence correlation spectroscopy (FCS), mainly including fluorescence autocorrelation spectroscopy (FACS) and fluorescence cross-correlation spectroscopy (FCCS), is a single-molecule optical detection method with ultra-high sensitivity, and is currently adopted as an important tool for the in-situ analysis of living cells. Regarding the fluorescence autocorrelation spectroscopy, the fluctuation of fluorescence signals caused by Brownian motion or chemical reaction of fluorescent molecules in a detection microregion (<1femtoliter (fL)) is recorded and then analyzed by autocorrelation function (ACF) to obtain a fluorescence autocorrelation spectroscopy curve, thereby calculating concentration, diffusion coefficient, chemical reaction rate constant, binding and dissociation constants of the fluorescent molecules. Since the FACS is a single-molecule optical analysis technique with good non-invasiveness, high sensitivity and excellent spatial resolution, it has been a predominant tool in the detection of living cells.

In the FACS, the intermolecular interaction between fluorescent molecules or fluorescent molecule-labeled biomolecules and other molecules is reflected by changes in the diffusion coefficient of the fluorescent molecules or fluorescent molecule-labeled biomolecules. Considering that the molecular diffusion rate is generally inversely proportional to a cube root of the molecular mass, a noticeable difference in the molecular mass after combined with other molecules is necessary for the observation of the diffusion coefficient variation. Moreover, the intracellular complex inhomogeneity and high congestion severely limit the application of the fluorescence autocorrelation spectroscopy in the researches of intermolecular interactions within living cells.

Different from the FACS, the FCCS generally uses two coaxial laser beams as the excitation source, and adopts a splitting optical path to construct two detection channels for fluorescence signals of different wavelengths. The cross-correlation function (CCF) analysis is performed on fluorescence fluctuation signals from two channels to obtain a fluorescence cross-correlation spectroscopy curve. The FCCS is commonly used for the analysis of interactions between two different fluorescent molecules in motion. When two molecules respectively labeled with groups of different fluorescence emission wavelengths are combined due to Brownian motion, the fluorescence signals of the two channels show synchronized fluctuation, and a fluorescence cross-correlation spectroscopy curve can be plotted through the FCCS. A higher proportion of molecules involved in the interaction will bring a larger amplitude G(0) in the FCCS.

By contrast, the molecular weight difference between two molecules interacting with each other is not specifically restricted in the FCCS, which indicates a stronger applicability to the analysis of intermolecular interactions. Therefore, it has become a powerful tool in the investigation of intermolecular interactions in living cells. Nevertheless, the expression of many biological functions in complex living systems such as cells is dependent on the binding interaction of three or more biomolecules, and the FCCS fails to be applied to the analysis of ternary intermolecular interactions.

SUMMARY

An object of the present disclosure is to provide a fluorescence triple-correlation spectroscopy system for analyzing an interaction between three kinds of molecules to enable the in-situ and real-time analysis of intermolecular binding between molecules labeled with three different fluorophores, thereby overcoming the defects in the prior art that the conventional fluorescence correlation spectroscopy fails to enable the in-situ analysis of the binding interaction between three kinds of molecules.

Technical solutions of this application are specifically described as follows.

This application provides a fluorescence triple-correlation spectroscopy system for analyzing an interaction between three kinds of molecules, comprising:

at least three excitation light sources;

wherein the at least three excitation light sources are configured to coaxially emit a laser beam; the laser beam is configured to illuminate a sample by sequentially passing through a collimating beam expander, a dichroic mirror, a galvanometer scanner, a scanning lens and a tube lens and then entering an objective lens, so as to excite the sample to generate a fluorescence signal; the fluorescence signal is collected by the objective lens, sequentially passed through the tube lens, the galvanometer scanner and the dichroic mirror and then focused by a focusing lens and then divided into four signal detection channels according to wavelength by three dichroic mirrors; the four signal detection channels are respectively focused by the focusing lens and transmitted by a multi-mode optical fiber to four single photon detectors for signal detection; the four signal detection channels are transmitted to a signal acquisition and operation card which is connected to the four single photon detectors for real-time collection and operation between any three signals of the four signal detection channels.

In some embodiments, the at least three excitation light sources are comprised of four lasers, at least three dichroic mirrors and at most one single-mode optical fiber, respectively, and four laser beams emitted by the four lasers are output from the single-mode optical fiber.

In some embodiments, before entering the objective lens to excite the sample, the laser beams output by the single-mode optical fiber are subjected to beam shaping by the collimating beam expander, the dichroic mirror, the galvanometer scanner, the scanning lens and the tube lens.

In some embodiments, the focusing lens is provide between the at least three dichroic mirrors to adjust the focusing of the fluorescence signal and the alignment of the signal detection channels.

In some embodiments, before the fluorescence signal is focused to an optical fiber head, at least three dichroic mirrors are arranged between the focusing lens and the four single photon detectors which enables the fluorescence signal of the sample to be divided into four signal detection channels according to wavelength.

In some embodiments, the fluorescence signal of each signal detection channel is focused by the focusing lens to the optical fiber head and transmitted to the single photon detector through the multi-mode optical fiber for confocal detection.

In some embodiments, the optical fiber head is mounted on a mechanical three-dimensional optical adjustment frame for an efficient collection of the fluorescence signal through the single photon detectors.

In some embodiments, the signal acquisition and operation card is configured to calculate a fluorescence triple-correlation spectroscopy curve in real time.

The present disclosure has the following beneficial effects.

(1) Spots formed by different laser beams transmitted through the same single-mode optical fiber and focused by the objective lens are overlapped, increasing an amplitude of the fluorescence triple-correlation spectroscopy curve.

(2) Detection volumes for different laser beams transmitted by the same single-mode optical fiber and focused by the objective lens are simultaneously less than 1 femtoliter (fL).

(3) The on-line and real-time calculation of the ternary correlation function involving three fluorescence fluctuation signals is achieved.

(4) The fluorescence correlation spectroscopy analysis of particles with four different fluorescence emission spectra is achieved, increasing the species number of fluorescent molecules that can be analyzed.

(5) The fluorescence triple-correlation spectroscopy system achieves the real-time recording and triple-correlation function (TCF) analysis of fluorescence fluctuation signals of three fluorescent molecules varying in emission wavelength in the detection micro-region (<1 fL), and a fluorescence triple-correlation spectroscopy curve is plotted. By analyzing a relationship between an amplitude of the fluorescence triple-correlation spectroscopy curve and a concentration of the fluorescent molecule complex, the analysis of the interaction between the three kinds of molecules is realized. The system provided herein is suitable for the in-situ analysis of the intermolecular interaction in living cells.

Figure 1:
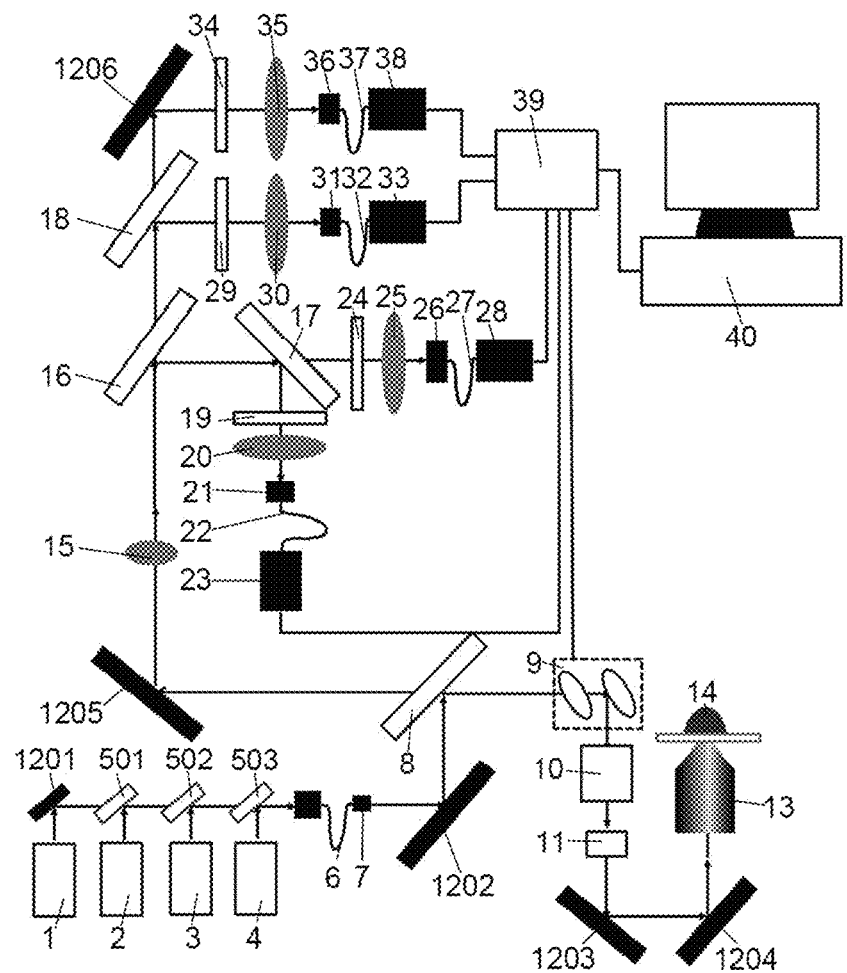
FIG. 1 schematically shows a structure of a fluorescence triple-correlation spectroscopy system according to an embodiment of the disclosure.

In the drawings: 1, first solid-state laser; 2, second solid-state laser; 3, third solid-state laser; 4, fourth solid-state laser; 501, first dichroic mirror; 502, second dichroic mirror; 503, third dichroic mirror; 6, single-mode optical fiber; 7, collimating beam expander; 8, fourth dichroic mirror; 9, galvanometer scanner; 10, scanning lens; 11, tube lens; 1201, first reflecting mirror; 1202, second reflecting mirror; 1203, third reflecting mirror; 1204, fourth reflecting mirror; 1205, fifth reflecting mirror; 1206, sixth reflecting mirror; 13, objective lens; 14, sample; 15, first focusing lens; 16, fifth dichroic mirror; 17, sixth dichroic mirror; 18, seventh dichroic mirror; 19, first band pass filter; 20, second focusing lens; 21, first optical fiber head; 22, first multi-mode optical fiber; 23, first single photon detector; 24, second band pass filter; 25, third focusing lens; 26, second optical fiber head; 27, second multi-mode optical fiber; 28, second single photon detector; 29, third band pass filter; 30, fourth focusing lens; 31, third optical fiber head; 32, third multi-mode optical fiber; 33, third single photon detector; 34, fourth band pass filter; 35, fifth focusing lens; 36, fourth optical fiber head; 37, fourth multi-mode optical fiber; 38, fourth single photon detector; 39, signal acquisition and operation card; and 40, computer.

DETAILED DESCRIPTION OF EMBODIMENTS

This application will be described below in detail with reference to the accompanying drawings and embodiments. It should be noted that these embodiments are merely illustrative, and are not intended to limit the scope of the disclosure.

Embodiment 1

Provided herein is a fluorescence triple-correlation spectroscopy system, including a first solid-state laser 1, a second solid-state laser 2, a third solid-state laser 3 and a fourth solid-state laser 4 (Sapphire™ or OBIS™ laser, Coherent, Inc.) configured to emit 640 nm, 561 nm, 488 nm and 405 nm laser beams, respectively. The laser beams are respectively transmitted through a first reflecting mirror 1201, a first dichroic mirror 501, a second dichroic mirror 502 and a third dichroic mirror 503 (DMLP567, DMLP490 and DMLP425, respectively, Thorlab, Inc.) to a collimating coupler (PAF2A-A10A, Thorlab, Inc.), and then coupled to be output by a single-mode optical fiber 6 (P3-405B, Thorlab, Inc.). After passing through a collimating beam expander 7 (F810APC-543, Thorlab, Inc.), the output laser beams are reflected by a second reflecting mirror 1202 and a fourth dichroic mirror 8 (ZT405/488/561/640rpcv2, Thorlab, Inc.), and then sequentially pass through a galvanometer scanner 9 (GVS012, Thorlab, Inc.), a scanning lens 10 (LSM03-VIS, Thorlab, Inc.), a tube lens 11, a third reflecting mirror 1203 and a fourth reflecting mirror 1204 to be focused to a rear aperture of an objective lens 13 (equipped with a 60× achromatic water-immersion lens with numerical aperture of 1.2, Olympus Corporation). The focused laser beam is transmitted to excite a sample 14 to generate a fluorescence signal. The fluorescence signal is focused by the objective lens 13 and then sequentially passes through the fourth reflecting mirror 1204, the third reflecting mirror 1203, the tube lens 11, the scanning lens 10, the galvanometer scanner 9 and the fourth dichroic mirror 8 to filter out the excitation light. Then, the fluorescence signal sequentially passes through a fifth reflecting mirror 1205, a first focusing lens 15, a fifth dichroic mirror 16 (T550lpxr, Chroma Technology Corporation), a sixth dichroic mirror 17 (T495lpxr, Chroma Technology Corporation) and a seventh dichroic mirror 18 (T685lpxr, Chroma Technology Corporation) to be divided into detection channels 1-4. The detection channel 1 is filtered by a first bandpass filter 19 (ET450/50m, Chroma Technology Corporation) and collected by a second focusing lens 20, and then passes through a first optical fiber head 21 to enter a first multi-mode optical fiber 22, and to be introduced into a first single photon detector 23 (SPCM-AQRH, Excelitas Technologies Corporation). The detection channel 2 is filtered by a second bandpass filter 24 (ET520/40m, Chroma Technology Corporation) and collected by a third focusing lens 25, and then passes through a second optical fiber head 26 to enter a second multi-mode optical fiber 27, and to be introduced into a second single photon detector 28. The detection channel 3 is filtered by a third band pass filter 29 (ET625/30m, Chroma Technology Corporation) and collected by a fourth focusing lens 30, and then passed through a third optical fiber head 31 to enter a third multi-mode optical fiber 32, and to be introduced into a third single photon detector 33. The detection channel 4 is filtered by a fourth band pass filter 34 (ET720/60m, Chroma Technology Corporation) and collected by a fifth focusing lens 35, and then passed through a fourth optical fiber head 36 to enter a fourth multi-mode optical fiber 37, and to be introduced into fourth single photon detector 38. Electrical signals output by the above-mentioned four single photon detectors are input to a signal acquisition and operation card 39 which is connected to a computer 40 to perform real-time acquisition of four fluorescence fluctuation signals ($I_1(t)$, $I_2(t)$, $I_3(t)$ and $I_4(t)$). The $I_2(t)$, $I_3(t)$ and $I_4(t)$ of detection channels 2-4 are subjected to real-time operation using a triple-correlation function (formula (1)) to obtain a fluorescence triple-correlation spectroscopy curve.

$$G_{2*3*4}(\tau_1, \tau_2) = \frac{\langle \delta I_2(t) \delta I_3(t+\tau_1) \delta I_4(t+\tau_2) \rangle}{\langle I_2(t) \rangle \langle I_3(t) \rangle \langle I_4(t) \rangle} \quad (1)$$

The fluorescence triple-correlation spectroscopy curve can be fitted with formula (2) by means of Origin (OriginLab) or Matlab (The Mathwork) using a nonlinear least squares Levenberg-Marquardt algorithm to obtain parameters such as G(0,0) and $\tau_D$:

$$G(\tau_1, \tau_2) = \frac{\alpha}{N^2} \times \frac{1}{\left(1 + \frac{4}{3\tau_D^2} \times \tau_1 \times (\tau_2 - \tau_1) + \frac{4\tau_2}{3\tau_D}\right)} \times \qquad (2)$$

$$\frac{1}{\sqrt{1 + \frac{4}{3\omega^4 \times \tau_D^2} \times \tau_1 \times (\tau_2 - \tau_1) + \frac{4\tau_2}{3\omega^2 \tau_D}}};$$

where $\tau_1$ is delay time when the detection channel 3 is correlated with the detection channel 2; $\tau_2$ is delay time when the detection channel 4 is correlated with the detection channel 2; $\tau_D$ is an average diffusion time of a complex formed by the three kinds of molecules; ω is a lateral radius of a laser focus overlapping zone; N is an average number of the complex in the laser focus overlapping zone; G(0,0) is an amplitude of the fluorescence triple-correlation spectroscopy curve, and is inversely proportional to N, namely the larger the N is, the more the complex is generated, indicating that the interaction between the three kinds of molecules is stronger.

Application Embodiment 1

Figure 2A:
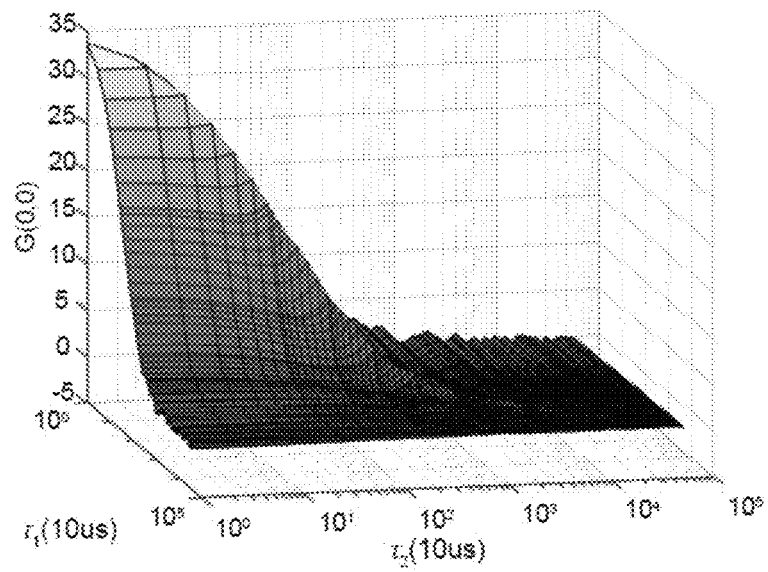
FIGS. 2A-2E show fluorescence triple-correlation spectroscopy curves of different concentrations of four-color fluorescent microsphere solutions (TetraSpeck™ microsphere-100 nm, Life Technologies Corporation) obtained by the fluorescence triple-correlation spectroscopy system, where 2A: $1.0 \times 10^{-10}$ mol/L; 2B: $5.00 \times 10^{-11}$ mol/L; 2C: $3.33 \times 10^{-11}$ mol/L; 2D: $2.50 \times 10^{-11}$ mol/L; and 2E: $1.25 \times 10^{-11}$ mol/L.
Figure 2B:
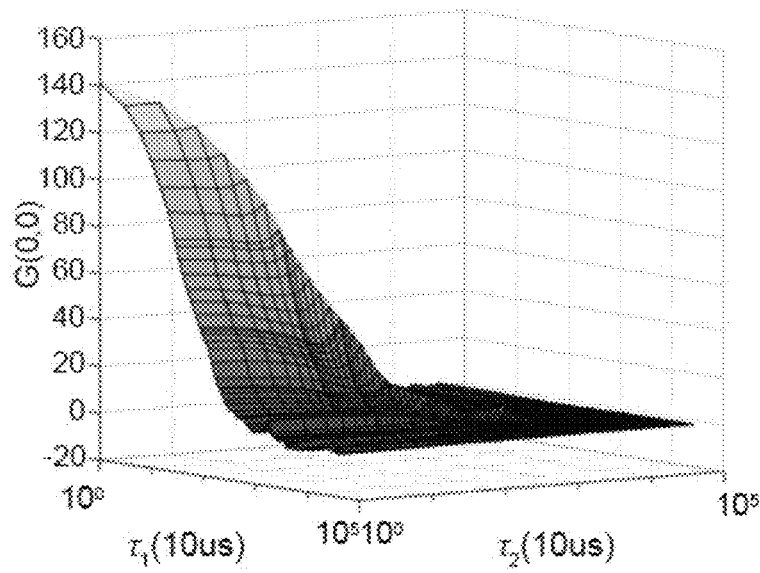
Figure 2C:
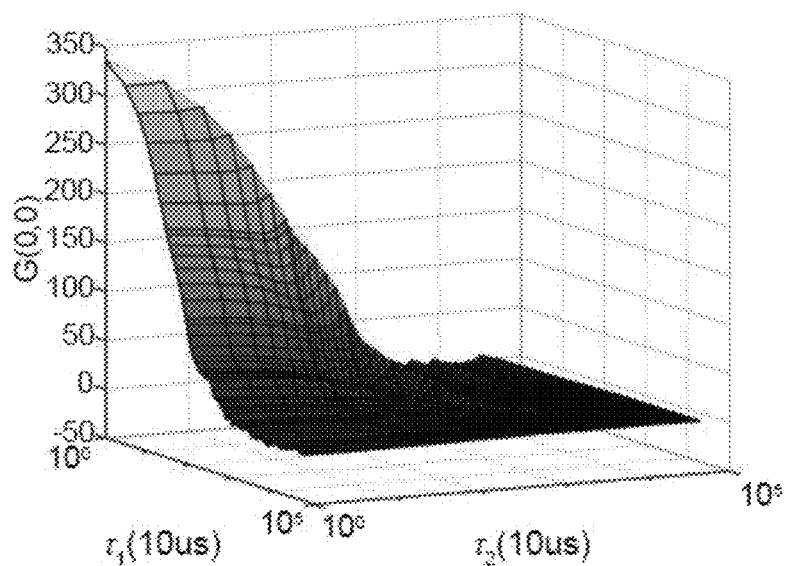
Figure 2D:
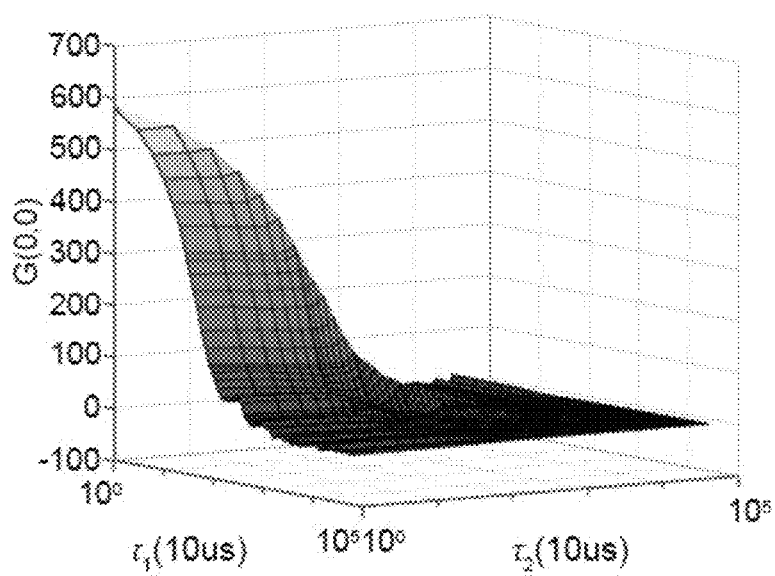
Figure 2E:
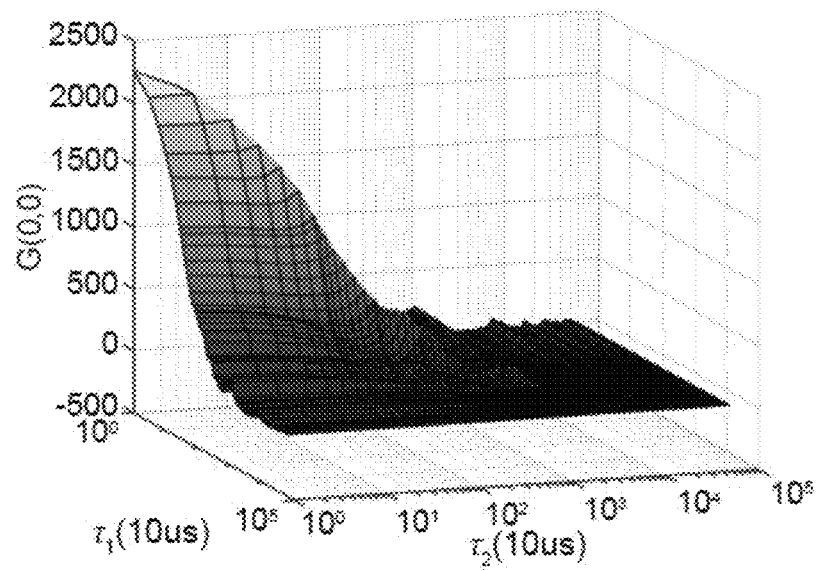
Figure 2F:
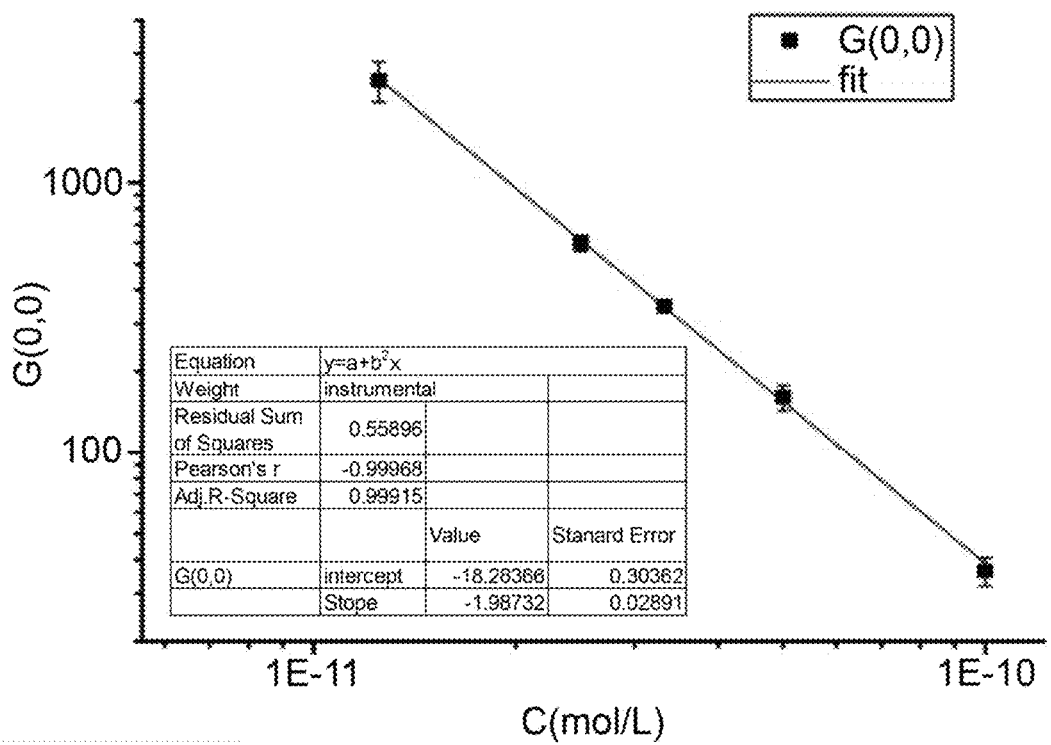
FIG. 2F shows a linear relationship between an amplitude G(0,0) of the fluorescence triple-correlation spectroscopy curve and the concentration of the four-color fluorescent microsphere solution.

A fluorescence triple-correlation spectroscopy analysis of particles with three different fluorescence emission spectra is provided using the fluorescence triple-correlation spectroscopy system of the present application. FIGS. 2A-2E show fluorescence triple-correlation spectroscopy curves of different concentrations of four-color fluorescent microsphere solutions (TetraSpeck microsphere of Life Technologies, 100 nm), where 2A: $1.0 \times 10^{-10}$ mol/L; 2B: $5.00 \times 10^{-11}$ mol/L; 2C: $3.33 \times 10^{-11}$ mol/L; 2D: $2.50 \times 10^{-11}$ mol/L; and 2E: $1.25 \times 10^{-11}$ mol/L. A sample is excited under the simultaneous illumination of 488 nm, 561 nm and 640 nm laser beams. The detection channels 2-4 are subjected to fluorescence triple-correlation spectroscopy experiments to obtain the fluorescence triple-correlation spectroscopy curves. A power of the 488 nm, 561 nm and 640 nm laser beams is approximately 5 microwatts, and a sampling time of a single photon counter is set to 30 s. Referring to FIGS. 2A-2E, the fluorescence triple-correlation spectroscopy curves are conformed to the fluorescence triple-correlation spectroscopy model. The amplitude G(0,0) increases with decreasing concentration, which is consistent with a theoretical model of fluorescence triple-correlation spectroscopy. FIG. 2F shows a linear relationship between the amplitude G(0,0) and the concentration of four-color fluorescent microsphere solution, a correlation coefficient ($R^2$) is greater than 0.99. These data indicate that FIGS. 2A-2E are fluorescence triple-correlation spectroscopy curves of the four-color fluorescent microsphere.

Application Embodiment 2

Figure 3:
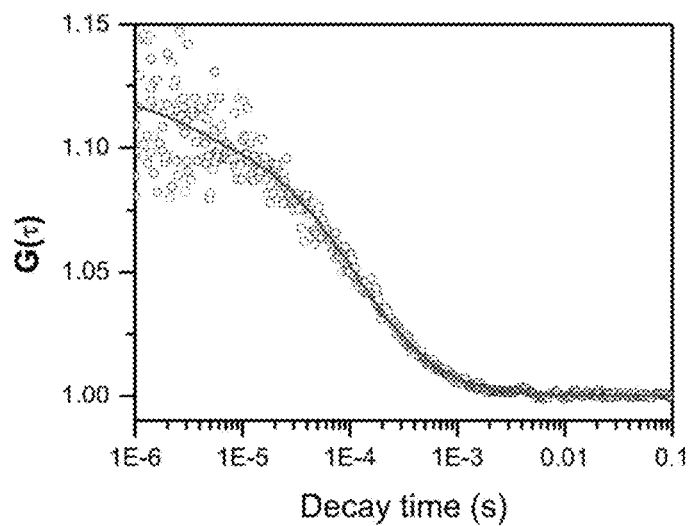
FIG. 3 shows a fluorescence autocorrelation spectroscopy curve of an aqueous solution containing Alexa Fluor 405, Rhodamine green, Alexa Fluor 568 and Alexa Fluor 647 varying in fluorescence emission wavelength, which is measured in a detection channel 1 using a fluorescence triple-correlation spectroscopy system excited by a 405 nm laser beam.

The fluorescence triple-correlation spectroscopy system provided herein is capable of performing a fluorescence autocorrelation spectroscopy analysis. FIG. 3 shows a fluorescence autocorrelation spectroscopy curve of an aqueous solution containing Alexa Fluor 405, Rhodamine green, Alexa Fluor 568 and Alexa Fluor 647 varying in fluorescence emission wavelength, which is obtained using the fluorescence triple-correlation spectroscopy system under an excitation of 405 nm laser beam. The power of the 405 nm laser beam is 35 microwatts and the sampling time of a single photon counter is 30 s. The fluorescence autocorrelation spectroscopy curve is fitted with a free diffusion model of FCS. A diffusion time is 105 microseconds. A transverse $1/e^2$ radius is 343 nm. A longitudinal $1/e^2$ radius is 1.252 um. A detected volume is 0.820 fL.

Figure 4:
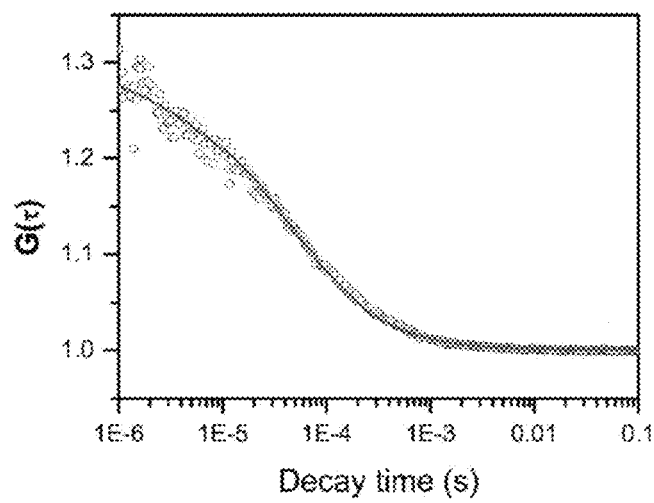
FIG. 4 shows a fluorescence autocorrelation spectroscopy curve of the aqueous solution containing Alexa Fluor 405, Rhodamine green, Alexa Fluor 568 and Alexa Fluor 647, which is measured in a detection channel 2 using a fluorescence triple-correlation spectroscopy system excited by a 488 nm laser beam.

FIG. 4 shows a fluorescence autocorrelation spectroscopy curve of the aqueous solution containing Alexa Fluor 405, Rhodamine green, Alexa Fluor 568 and Alexa Fluor 647 varying in fluorescence emission wavelengths, which is obtained using the fluorescence triple-correlation spectroscopy system under an excitation of 488 nm laser beam. The power of the 488 nm laser beam is 35 microwatts and the sampling time of the single photon counter is 30 s. The fluorescence autocorrelation spectroscopy curve is fitted with the free diffusion model of FCS. A diffusion time is 48.4 microseconds. A transverse $1/e^2$ radius is 233 nm. A longitudinal $1/e^2$ radius is 1.040 um. A detected volume is 0.313 fL.

Figure 5:
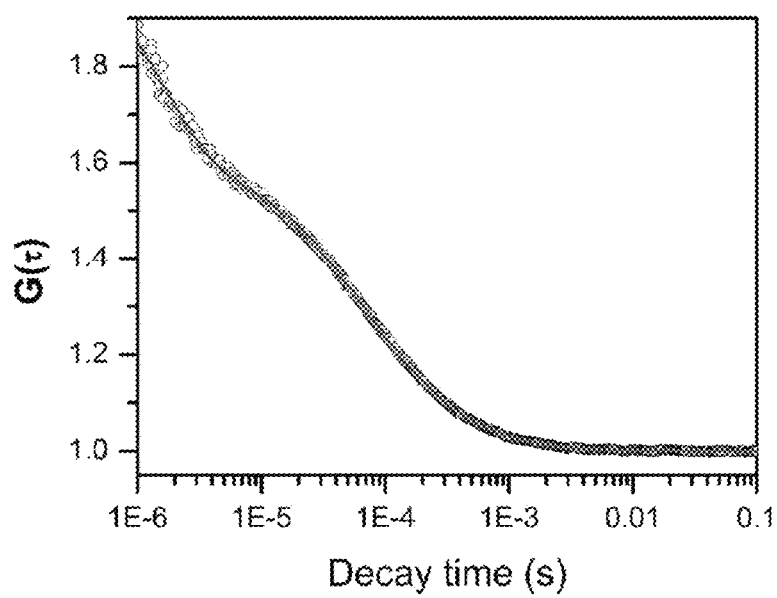
FIG. 5 shows a fluorescence autocorrelation spectroscopy curve of the aqueous solution containing Alexa Fluor 405, Rhodamine green, Alexa Fluor 568 and Alexa Fluor 647, which is measured in a detection channel 3 using a fluorescence triple-correlation spectroscopy system excited by a 561 nm laser beam.

FIG. 5 shows a fluorescence autocorrelation spectroscopy curve of the aqueous solution containing Alexa Fluor 405, Rhodamine green, Alexa Fluor 568 and Alexa Fluor 647 varying in fluorescence emission wavelengths, which is obtained using the fluorescence triple-correlation spectroscopy system under an excitation of 568 nm laser beam. The power of the 488 nm laser beam is 35 microwatts and a sampling time of the single photon counter is 30 s. The fluorescence autocorrelation spectroscopy curve is fitted with the free diffusion model of FCS. A diffusion time is 66.8 microseconds. A transverse $1/e^2$ radius is 274 nm. A longitudinal $1/e^2$ radius is 1.479 um. A detected volume is 0.616 fL.

Figure 6:
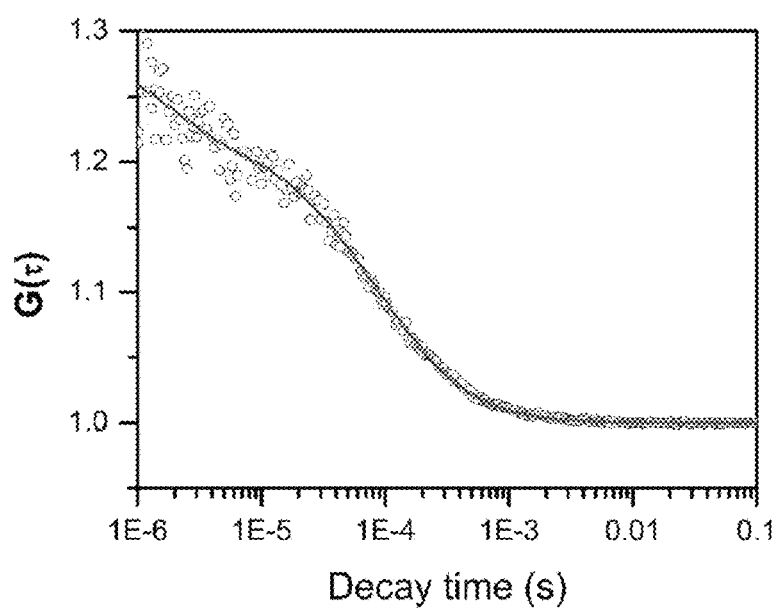
FIG. 6 shows a fluorescence autocorrelation spectroscopy curve of the aqueous solution containing Alexa Fluor 405, Rhodamine green, Alexa Fluor 568 and Alexa Fluor 647, which is measured in a detection channel 4 using a fluorescence triple-correlation spectroscopy system excited by a 640 nm laser beam.

FIG. 6 shows a fluorescence autocorrelation spectroscopy curve of the aqueous solution containing Alexa Fluor 405, Rhodamine green, Alexa Fluor 568 and Alexa Fluor 647 varying in fluorescence emission wavelengths, which is obtained using the fluorescence triple-correlation spectroscopy system under an excitation of 640 nm laser beam. The power of the 640 nm laser beam is 35 microwatts and the sampling time of the single photon counter is 30 s. The fluorescence autocorrelation spectroscopy curve is fitted with the free diffusion model of FCS. A diffusion time is 90.2 microseconds. A transverse $1/e^2$ radius is 318 nm. A longitudinal $1/e^2$ radius is 1.542 um. A detected volume is 0.867 fL.

Fluorescence autocorrelation spectroscopy curves are obtained by adopting the four fluorescent dyes varying in fluorescence emission wavelength as probe, indicating that in the fluorescence triple-correlation spectroscopy system, the coaxial excitation and focal spot coincidence of the four laser beams are achieved by means of the transmission using the same single-mode optical fiber and the focusing using the objective lens. The detected volumes are all less than 1 fL, satisfying the requirements of fluorescence correlation spectroscopy in single-molecule detection. The results also demonstrate that the fluorescence triple-correlation spectroscopy system designed herein enables the simultaneous detection of four different components.

Application Embodiment 3

Figure 7:
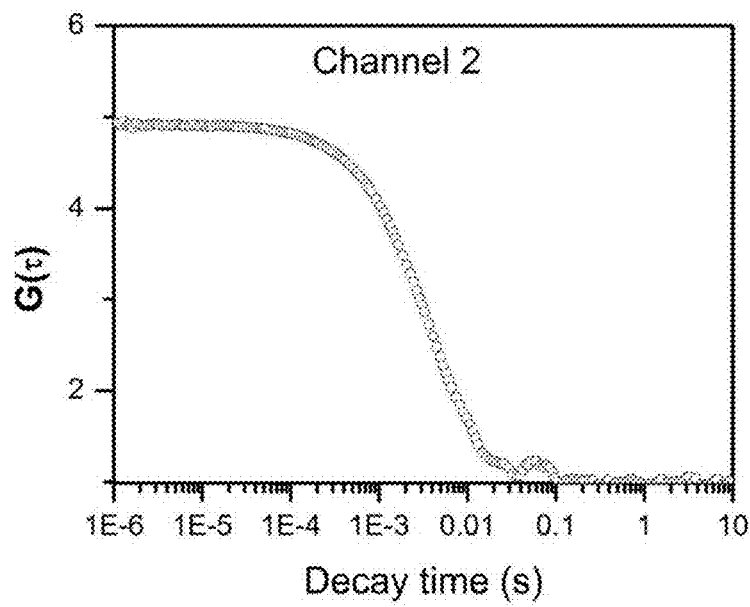
FIG. 7 shows a fluorescence autocorrelation spectroscopy curve of an aqueous four-color fluorescent microsphere solution (TetraSpeck™ microsphere-100 nm, Life Technologies Corporation), which is measured in the detection channel 2 using the fluorescence triple-correlation spectroscopy system under the simultaneous excitation of 488 nm, 561 nm and 640 nm laser beams.
Figure 8:
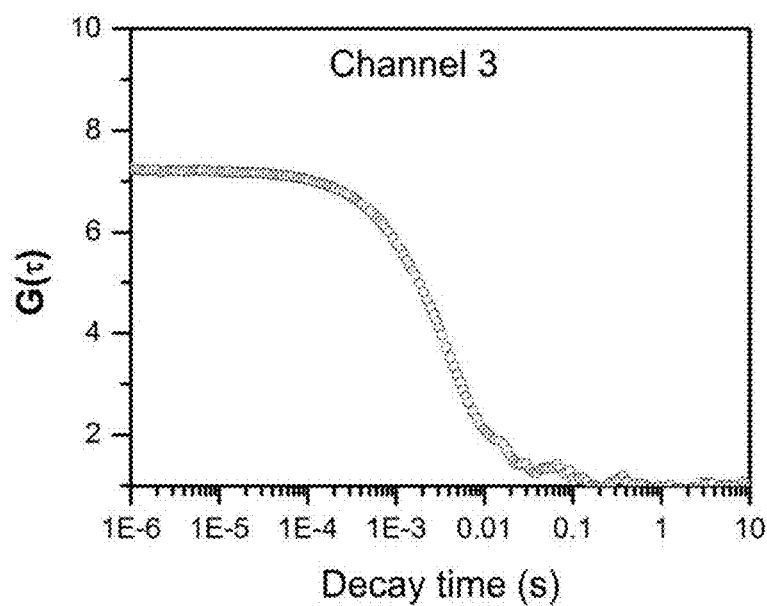
FIG. 8 shows a fluorescence autocorrelation spectroscopy curve of the aqueous four-color fluorescent microsphere solution (TetraSpeck™ microsphere-100 nm, Life Technologies Corporation), which is measured in the detection channel 3 using the fluorescence triple-correlation spectroscopy system under the simultaneous excitation of 488 nm, 561 nm and 640 nm laser beams.
Figure 9:
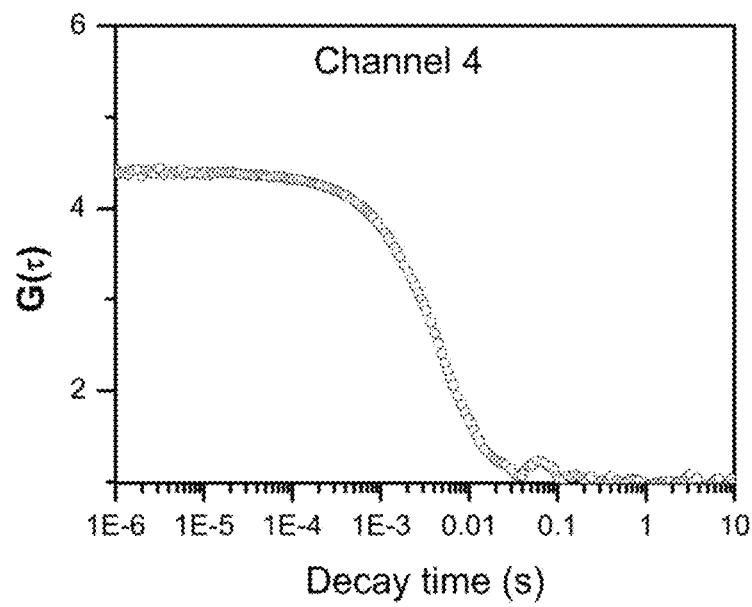
FIG. 9 shows a fluorescence autocorrelation spectroscopy curve of the aqueous four-color fluorescent microsphere (TetraSpeck™ microsphere-100 nm, Life Technologies Corporation), which is measured in the detection channel 4 using the fluorescence triple-correlation spectroscopy system under the simultaneous excitation of 488 nm, 561 nm and 640 nm laser beams.
Figure 10:
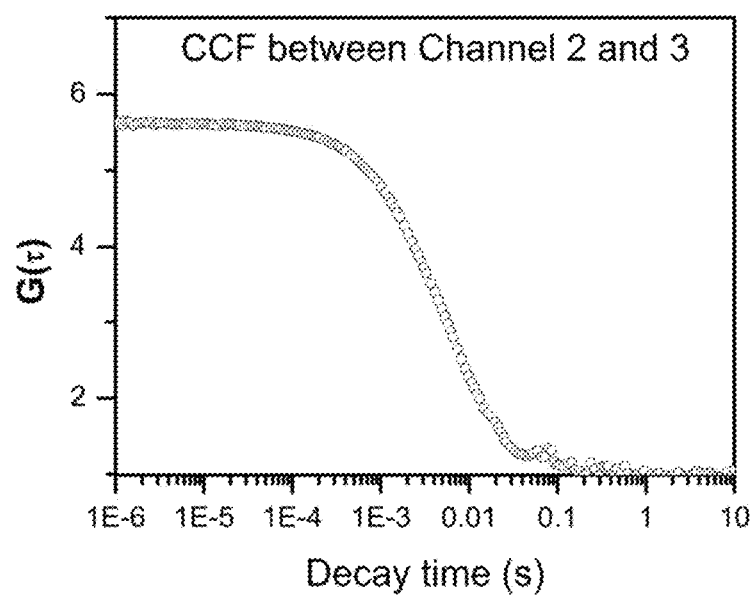
FIG. 10 shows a fluorescence cross-correlation spectroscopy curve of the aqueous four-color fluorescent microsphere solution (TetraSpeck™ microsphere-100 nm, Life Technologies Corporation), which is measured in the detection channel 2 and detection channel 3 using the fluorescence triple-correlation spectroscopy system under the simultaneous excitation of 488 nm, 561 nm and 640 nm laser beams.
Figure 11:
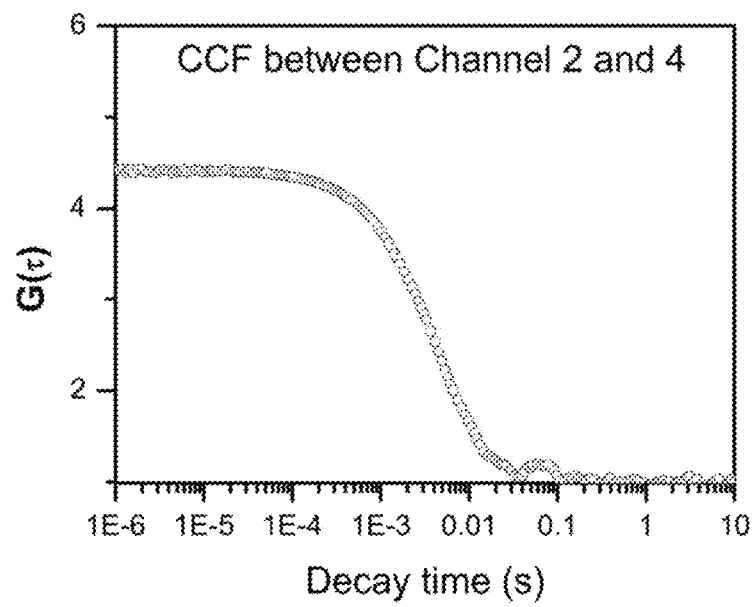
FIG. 11 shows a fluorescence cross-correlation spectroscopy curve of the aqueous four-color fluorescent microsphere solution (TetraSpeck™ microsphere-100 nm, Life Technologies Corporation), which is measured in the detection channel 2 and detection channel 4 using the fluorescence triple-correlation spectroscopy system under simultaneous excitation of 488 nm, 561 nm and 640 nm laser beams.
Figure 12:
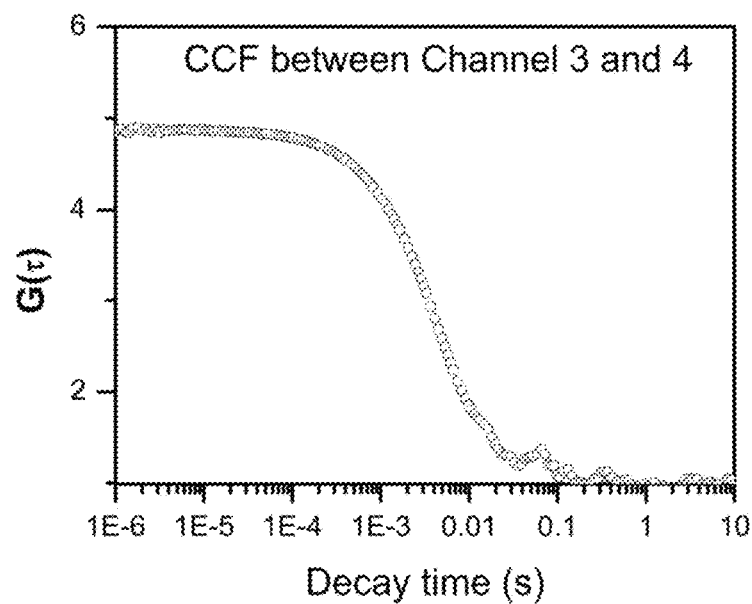
FIG. 12 shows a fluorescence cross-correlation spectroscopy curve of the aqueous four-color fluorescent microsphere solution (TetraSpeck™ microsphere-100 nm, Life Technologies Corporation), which is measured in the detection channel 3 and detection channel 4 using the fluorescence triple-correlation spectroscopy system under the simultaneous excitation of 488 nm, 561 nm and 640 nm laser beams.

The fluorescence triple-correlation spectroscopy system provided herein is capable of performing a fluorescence cross-correlation spectroscopy analysis. A fluorescence cross-correlation spectroscopy experiment and a fluorescence autocorrelation spectroscopy experiment of the aqueous solution containing the four-color fluorescent microsphere (TetraSpeck™ microsphere-100 nm, Life Technologies Corporation) are performed using the fluorescence triple-correlation spectroscopy system under a simultaneous excitation of the 488, 561 and 640 nm laser beams. The power of the 488 nm, 561 nm and 640 nm laser beams are 5 microwatts, and a sampling time of the single photon counter is 30 s. FIGS. 7-9 show fluorescence autocorrelation spectroscopy curves using the detection channels 2-4, respectively. FIG. 10 shows a fluorescence cross-correlation spectroscopy curve obtained using the detection channels 2 and 3. FIG. 11 shows a fluorescence cross-correlation spectroscopy curve obtained using the detection channels 2 and 4. FIG. 12 shows a fluorescence cross-correlation spectroscopy curve obtained using the detection channels 3 and 4.

What is claimed is:

1. A fluorescence triple-correlation spectroscopy system for analyzing an interaction between three kinds of molecules, comprising:
at least three excitation light sources varying in emission wavelength;
wherein the at least three excitation light sources are configured to coaxially emit laser beams to illuminate and excite a sample to generate a fluorescence signal; the fluorescence signal is divided into a plurality of signal detection channels by a plurality of first dichroic mirrors according to wavelength and then respectively transmitted to a single photon detector for signal detection, and then transmitted to a signal acquisition and operation card;
the signal acquisition and operation card is connected to the single photon detector, and the signal acquisition and operation card is configured for real-time operation, to obtain a fluorescence triple-correlation spectroscopy curve;
the at least three excitation light sources each comprise a first laser, a second laser and a third laser, wherein the first laser is configured to emit a 488 nm laser beam, the second laser is configured to emit a 561 nm laser beam, and the third laser is configured to emit a 640 nm laser beam;
the real-time operation is performed using a triple-correlation function expressed as follows:

$$G_{2*3*4}(\tau_1, \tau_2) = \frac{\langle \delta I_2(t) \delta I_3(t+\tau_1) \delta I_4(t+\tau_2) \rangle}{\langle I_2(t) \rangle \langle I_3(t) \rangle \langle I_4(t) \rangle};$$

wherein t is time; $I_2(t)$ indicates a fluorescence intensity fluctuation signal excited by the 488 nm laser beam; $I_3(t)$ indicates a fluorescence intensity fluctuation signal excited by the 561 nm laser beam; and $I_4(t)$ indicates a fluorescence intensity fluctuation signal excited by the 640 nm laser beam wherein $\tau_1$ indicates a delay time when a 561 nm detection channel is correlated with a 488 nm detection channel; and $\tau_2$ indicates a delay time when a 640 nm detection channel is correlated with the 488 nm detection channel.

2. The fluorescence triple-correlation spectroscopy system of claim 1, wherein the 488 nm laser beam, the 561 nm laser beam and the 640 nm laser beam are treated by second dichroic mirrors or reflecting mirrors, and pass through a collimating coupler, and then output from the same single-mode optical fiber through a collimating coupler.

3. The fluorescence triple-correlation spectroscopy system of claim 1, wherein the 488 nm laser beam, the 561 nm laser beam and the 640 nm laser beam are configured to sequentially pass through a collimating beam expander, a second dichroic mirror, a galvanometer scanner, a scanning lens and a tube lens to enter an objective lens to excite the sample.

4. The fluorescence triple-correlation spectroscopy system of claim 3, wherein the fluorescence signal is focused by the objective lens, reflected by the reflect mirror, and passes through the tube lens, the scanning lens and the galvanometer scanner to reach the second dichroic mirror to filter out an excitation light, and then divided into the plurality of signal detection channels; and
a focusing lens is arranged between the second dichroic mirror and the plurality of first dichroic mirrors.

5. The fluorescence triple-correlation spectroscopy system of claim 1, wherein the fluorescence signal is divided by at least three first dichroic mirrors into at least four signal detection channels according to the wavelength.

6. The fluorescence triple-correlation spectroscopy system of claim 1, wherein the plurality of signal detection channels are respectively focused by a focusing lens to an optical fiber head and transmitted to the corresponding single photon detector through a multi-mode optical fiber.

7. The fluorescence triple-correlation spectroscopy system of claim 1, wherein the signal acquisition and operation card is connected to the single photon detector to perform the real-time operation of the triple-correlation function and obtain the fluorescence triple-correlation spectroscopy curve of three of the plurality of signal detection channels.

8. The fluorescence triple-correlation spectroscopy system of claim 1, wherein the signal acquisition and operation card is also connected to a galvanometer scanner.

* * * * *